Jan. 4, 1944.　　　A. MARTINEK　　　2,338,124
GLAREPROOF SHIELD
Filed April 25, 1940　　　3 Sheets-Sheet 1
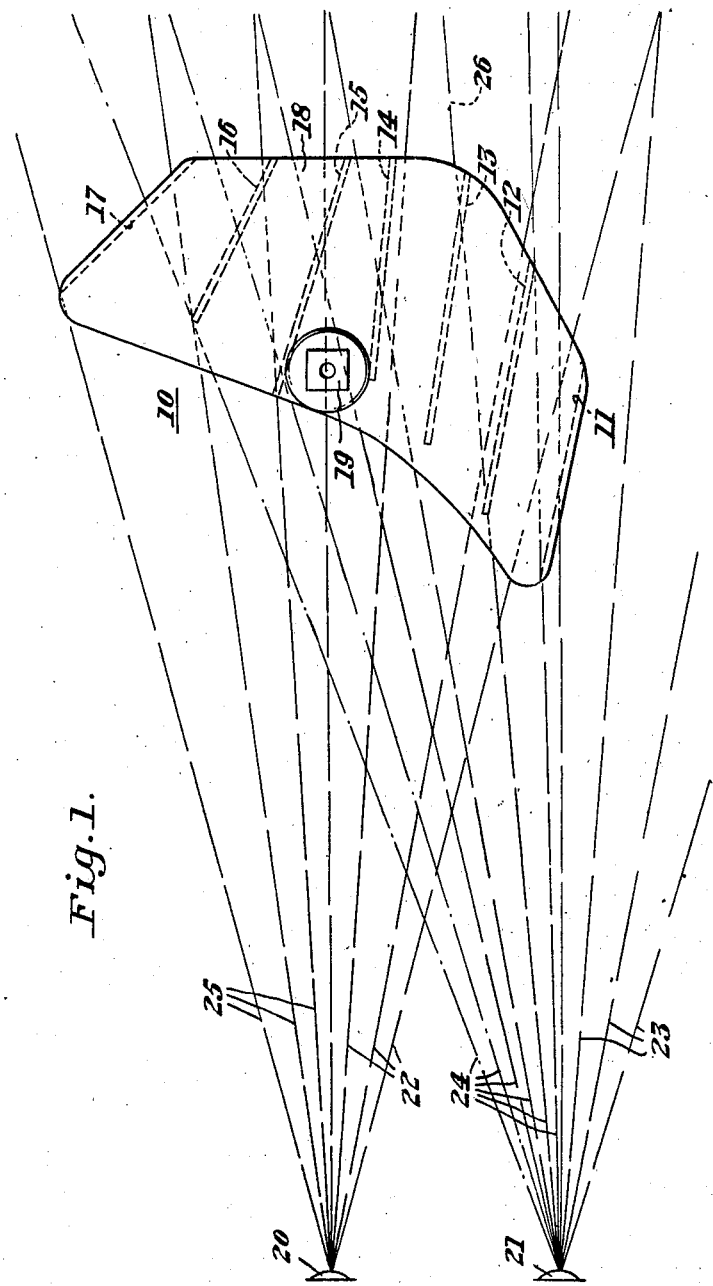
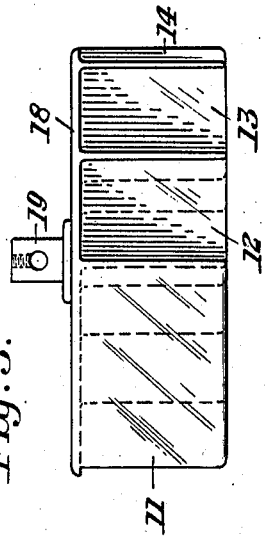
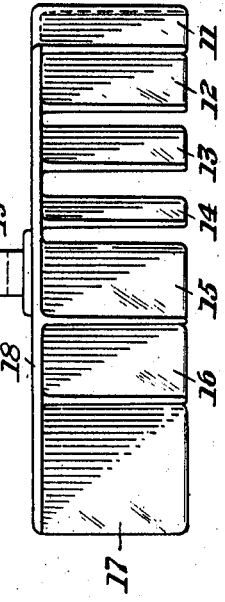
INVENTOR
Anthony Martinek
by his attorney Jan. 4, 1944.　　　　A. MARTINEK　　　　2,338,124
GLAREPROOF SHIELD
Filed April 25, 1940　　　3 Sheets-Sheet 2

INVENTOR
Anthony Martinek
by his attorney

Jan. 4, 1944.  A. MARTINEK  2,338,124
GLAREPROOF SHIELD
Filed April 25, 1940   3 Sheets-Sheet 3
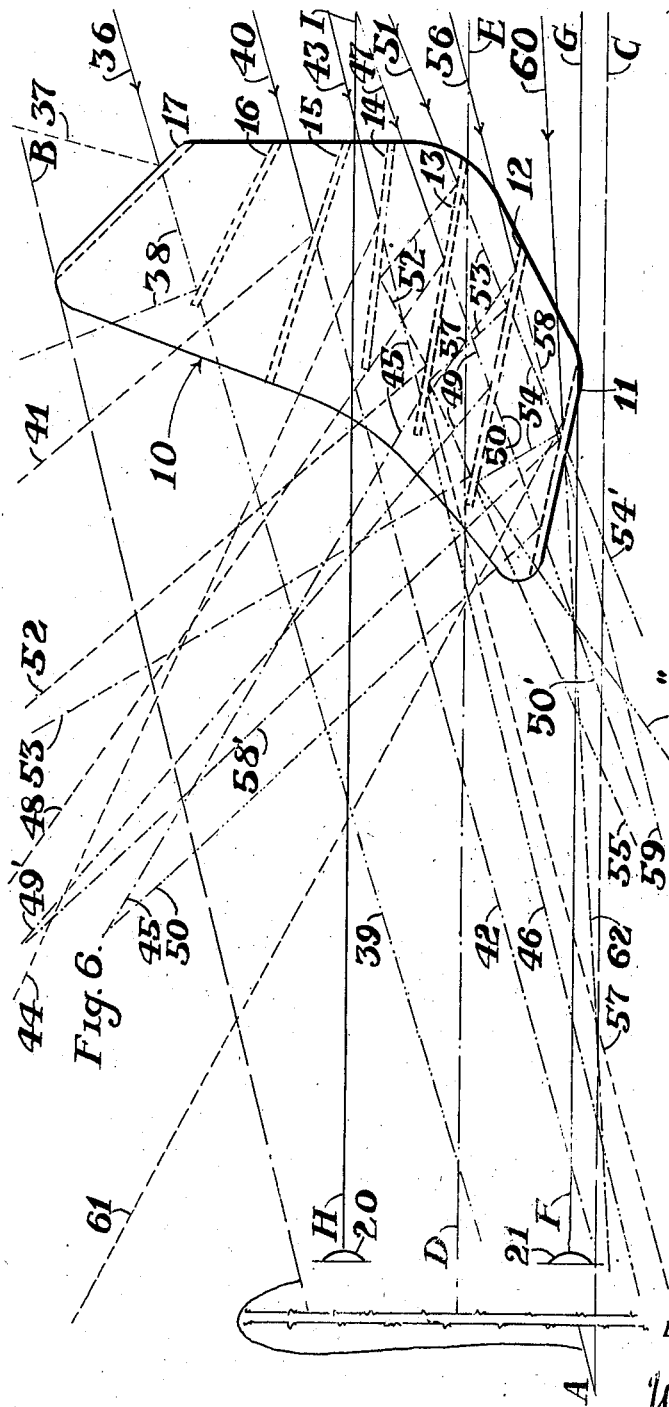
INVENTOR.
Anthony Martinek
BY his attorney Patented Jan. 4, 1944

2,338,124

UNITED STATES PATENT OFFICE 2,338,124

GLAREPROOF SHIELD

Anthony Martinek, Pittsburgh, Pa.

Application April 25, 1940, Serial No. 331,568

20 Claims. (Cl. 296—97)

This invention relates to a device for protecting the eyes from excessive glare and, particularly, to a device of the character indicated for the use of a motorist when driving at night.

The glare created by the headlights of approaching vehicles is recognized as one of the serious hazards of night driving and, although many proposals have been made for its elimination, none of them, so far as I am aware, has been entirely successful. The present invention is based on novel concepts and accomplishes its intended objects satisfactorily without the shortcomings of previous expedients. While the driver should be protected against glare caused by an approaching vehicle, he also should be given as large and clear a view as possible of what lies ahead. This invention provides a graded screening effect whereby certain portions of the field of view are subject to little or no obstruction whereas that portion in which the glare is greatest is provided with a substantial screening effect, such effect being proportional to the need. To accomplish the above ends shields constructed according to my invention:

1. Screen only a portion of the whole field of vision;

2. Within that portion, screen only the dangerous portion;

3. Differentially screen that dangerous portion by destroying glare while permitting unobstructed view of the right-hand side of the road.

Shields made according to my invention deflect much of the light of the oncoming vehicle from the eyes of the driver by directing them entirely outside of his field of vision. This result is accomplished only because my invention is based on the principle of avoiding such reflection by the shielding instrumentalities that the reflected rays reach the eyes of the driver. I thereby overcome a major defect of many previous devices which were so constructed that the surfaces of the screens reflected unwanted light into the eyes of the driver and often by double reflection actually multiplied the images of the oncoming headlights thus adding confusion to the glare which they sought unsuccessfully to reduce.

In a preferred embodiment, my invention comprises a plurality of vertical plane light obscuring transparent screens disposed obliquely to the longitudinal axis of the driven vehicle and mounted, preferably just back of the windshield of a motor vehicle, hereafter called the driven vehicle, a short distance ahead of the driver's eyes. The screens are arranged in right and left-hand groups. The screens of the right-hand group are slightly inclined forwardly and to the right relatively to the longitudinal axis of the driven motor vehicle while the screens of the left-hand group are inclined in the same direction but at a greater angle. The length of the screens, furthermore, is so determined that no objectionable single or double reflection of light rays from a headlamp of an oncoming vehicle will be directed into the eyes of the driver. Such double reflections are the reflections of such rays from one screen to another and then toward the eyes of the driver.

Further details of the invention and the novel features will be understood from the following description and drawings and particularly pointed out in the appended claims. It will be understood, however, that the invention may be embodied in forms other than those shown, within the scope of the broader claims. The detailed description refers to the accompanying drawings which illustrate a preferred embodiment. In the drawings:

Figure 1 is a plan view of the invention, illustrating diagrammatically the effect thereof on light rays passing therethrough to the user's eyes;

Figure 2 is a rear elevation;

Figure 3 is a side elevation;

Figure 6 is a diagrammatic showing, similar to Figure 1, except as noted hereinafter, indicating how I avoid objectional reflection and illustrating mathematical and geometrical principles of one example of my invention;

Figure 7 is a diagrammatic skeletal view showing a driven vehicle equipped with my shield disposed as in Figure 6 meeting an approaching vehicle; and Figures 8 and 9 are fragmentary views showing alternative constructions which I may employ.

Figure 5:
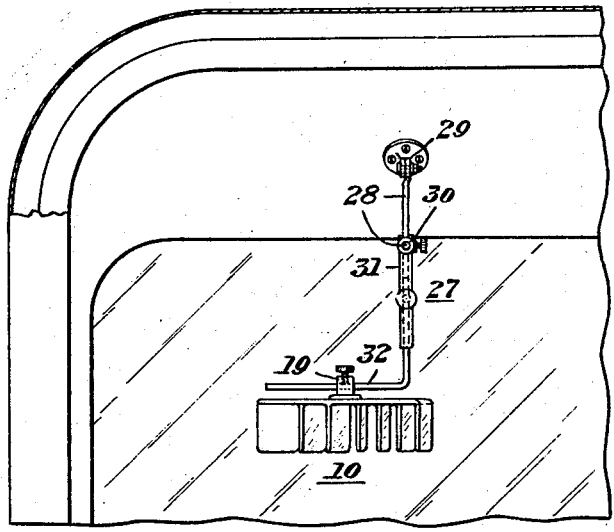
Figure 5 is a view partly in section along the line V—V of Figure 4 looking in the direction of the arrows and partly in elevation.

This invention comprises a unitary shield made up of an assembly of transparent light-retarding screens. The shield as a whole is designated 10 and the individual screens are numbered from 11 to 17 inclusive. Each individual screen is in the form of a vertical plane composed of suitable transparent light-retarding screening material. The screens conveniently may be molded integrally with a transverse web 18 and may be formed of suitable transparent plastic or glass or the like. A stud 19 may be formed integrally with the shield 10 or cemented to the transverse web 18, for mounting the shield on a suitable support. Alternatively, as later described and as illustrated in Figures 8 and 9, I may form the screens separately from the web and then assemble them.

Color may be used to reduce the amount of light transmitted to the eyes of the driver or the screens may be of such characteristics that they reduce the total amount of light transmitted without materially changing its color characteristics. Green, amber, violet or other desired color may be employed. In a commercial embodiment of my invention I have found desirable a green tone which subdues both blue and red rays, but does not entirely eliminate either so that the colors of traffic lights may be recognized without difficulty. The following spectral transmission is illustrative:

| Wavelength, Ångstrom units | Percentage of transmission |
| --- | --- |
| 4,000–4,500 | 1 to 2 |
| 4,500–5,000 | 5 to 8 |
| 5,000–5,500 | 30 to 40 |
| 5,500–6,000 | 25 to 30 |
| 6,000–6,500 | 50 to 80 |
| 6,500–7,000 | 1 to 2 |

The total transmission may be only about 25% to 30%.

It is to be understood that I am in no way limited to a screen of the above color characteristics but that I am merely stating the characteristics of a screen which I have found effective.

The shield may be placed in either of two positions relatively to the eyes of the driver. As shown in Figure 1, the shield is so disposed that the lines of sight of both eyes of the driver in a direction straight ahead, that is parallel to the longitudinal axis of the driven vehicle, intersect one screen only while such lines of sight directed toward the right of the road are free from obstruction but of course both eyes are protected from the glare coming from the left. Alternatively and as shown in Figure 6, the shield is so placed that the driver can see straight ahead and observe the portion of the road from approximately its center to the extreme right without obstruction, while both eyes are screened from the glare which comes from the left. The diagram of Figure 7 illustrates the effect of my shield placed as shown in Figure 6. I use the words "right" and "left" from the point of view of the driver of the driven vehicle.

In devices previously proposed for protecting a driver from glare, no attention has been paid, so far as I am aware, to the problem of reflection. Although the screens which have been proposed in many cases have initially diminished or diverted the oncoming rays or a portion of them, in many instances they have made the problem worse by reflecting all or a portion of the diverted rays, in some cases multiplied many times by repeated reflection, into the eyes of the driver. Heretofore, as a practical matter, the glare of the oncoming vehicle has been broken up into a myriad of independent dazzling images of the oncoming headlights. Obviously transparent bodies must be used for diminishing light. Light which impinges upon a surface of such transparent bodies is in part transmitted and in part reflected. If the body is light-retarding, the effect upon the eye of the transmitted beam is much diminished. Many of the reflected beams from surfaces other than at a right angle to the transverse plane of the screen, however, may be and, so far as I am aware, always have been, caused to impinge upon the eyes through either internal reflection from a shield set in the transverse plane of the field of vision or through single or more often double reflection through a screen set at an angle to such transverse plane. A single incident beam may be repeatedly broken up so that a large number of different images of the oncoming headlight may strike the eye of the driver, thus resulting in a condition much worse than the one which the device is supposed to cure.

My invention screens the eyes of the driver from the glare of the light of the oncoming vehicle and at the same time overcomes these evils of reflection. I so arrange the individual screens which make up my shield that substantially all of the rays which are reflected from the surfaces of the screens pass outside of the angle of vision of the driver while those which strike his eyes are of lessened intensity. By "angle of vision" I mean the angle which is roughly indicated as bounded by the lines A—B and A—C of Figure 6. It will be understood that the projection of this angle of vision does not bound the area within which the driver must be protected from the glare of an oncoming vehicle. Between the shield and the eyes of the driver the projection of this angle bounds the area outside of which substantially all rays of light reflected from the screens must be directed. In the form of my invention shown in Figures 6 and 7, the driver's vision forwardly through a portion of the area bounded by the projection of this angle should be and is unobstructed. In the form of my invention shown in Figure 1, this vision when forward in a line parallel to the longitudinal axis of the driven vehicle is protected by one screen. Full protection against glare from the left is provided.

I avoid objectionable reflection by a careful placing of the screens within this angle of vision. The angular relation between the screens is important from the standpoint of reflection and also from that of affording safe driving vision and avoiding glare. Also the screens must be of varying lengths if all of the results of my invention are to be secured.

It will be observed that the screens 11 through 17 are arranged in groups. The screens 11 through 14 constitute the right-hand group and the screens 15 through 17 the left-hand group, as viewed through the eyes of the driver whose left eye is indicated at 20 and whose right eye is indicated at 21 and also in relation to the longitudinal axis or straight ahead direction of the driven vehicle, which in Figure 6 is indicated as DE. All the screens are vertically disposed and inclined forwardly to the right in relation to the longitudinal axis of the driven vehicle. The inclination of the screens of the right-hand group is relatively slight and decreases slightly toward the left, the range of angularity to such longitudinal axis being shown for purposes of illustration as from about 5° to 12°. Pairs of these right-hand screens converge slightly toward the rear and do not obstruct the normal view of the left eye 20 of the right-hand side of the road. The inclination of the screens of the left-hand group is greater and increases progressively toward the left, ranging as shown for purposes of illustration from about 5°

(screen 14) or 17° (screen 15) to about 45° (screen 17). Pairs of the left-hand screens converge at the front of the transverse plane of the shield. If the full results of my invention are to be secured, I have found these angles of inclination critical to within 2 or 3 degrees.

Screens 14 and 16 may be considered to be intermediates which are used for destroying double reflection, or, to speak more accurately, for causing ultimately emergent reflected beams to pass outside of the angle of vision and hence be harmless. As a practical matter, this deflection from the line D—E which represents a longitudinal axis of the driven vehicle at a point substantially midway between the eyes of the driver must be of the order of 25 degrees or more in the shields which I have found most effective. The screens 11 through 17 are of different lengths. The lengths of the screens are so chosen as to prevent the double reflection of a light ray substantially parallel to the longitudinal axis of the driven vehicle from one screen to another and thence into the user's eyes.

It will be understood that the device as described herein is intended for use in localities where the rule of the road is "keep right." Where the opposite rule prevails as in Great Britain, it is merely necessary to reverse the design to make it of opposite hand and, while I have used the terms right-hand and left-hand in the appended claims to define the construction illustrated, it will be understood that such terms are to be read in the opposite sense to cover the device as made for driving where traffic keeps to the left.

While I am not committing myself to specific formulae since different conditions demand different arrangements of screens within the principles of my invention, there are certain general mathematical statements which can be made for purposes of illustration. The lines F—G and H—I of Figure 6 may be considered "eye beams." Each is parallel to the longitudinal axis as D—E of the driven vehicle and each intersects an eye of the driver and the shield but, as shown in Figure 6, does not pass through a screen. In the forms of my invention which I am showing for purposes of illustration, the angle formed by the reflection of every ray and the projected plane of the screen forming it must be of the order of not less than 20 degrees. That is to say, the spatial and angular relation of the screens is such that the ultimate emergent reflection is of the order of 20 degrees or more so that it will fall outside of the angle of vision of the driver.

The angles between the screens of the left group are of less importance from the standpoint of unwanted reflections than are those of the right. It also must be remembered that such a shield must intersect and handle a myriad of light rays impinging from different directions but confined within certain limits.

It is to be remembered that the relative position of the headlights of the driven and approaching vehicles constantly change until they have passed. Consequently all mathematical statements of relations are to be considered as typical rather than closely definitive.

Figure 6 illustrates the behavior of a few typical rays striking the screens. For simplicity, refraction has been disregarded and certain reflections have been omitted. The incident rays are shown in single line and those once reflected in dashes. Rays which are transmitted through one screen, whether reflected or not, are shown in single dot and single dash. Rays which are transmitted through two screens or more and their reflections are shown in double dots and single dashes.

Ray 36 strikes screen 17 and is reflected as 37 but the portion transmitted as 38 is in part reflected by screen 16 to a point outside the field of vision and in part transmitted in still further decreased intensity as 39 to the eyes of the driver. Ray 40 strikes screen 15 and is reflected as 41 and transmitted as 42. Incident ray 43 is reflected by screen 14 as 44 and transmitted as 45 and reflected by screen 13 to a point outside of the field of vision and transmitted by screen 13 as 46. Incident ray 47 is reflected by screen 13 as 48 barely missing the end of screen 14 and passing outside of the field of vision. Its transmitted portion 49 is in part harmlessly reflected by screen 12 as 49' and in part transmitted as 50 to screen 11. Ray 50 is then in part reflected by screen 11 and in part transmitted as 50'. Incident ray 51 is reflected as 52 by screen 13 to screen 14 back to screen 13 and thence out of the field of vision. A portion 53 of ray 51 after being transmitted through 13 is reflected by 12 to 13 and and back to 12 and then to a point outside of the field of vision. Another portion of this ray also passes through screen 12 and to a point outside of the field of vision but is not shown for purposes of clarity. A portion 54 of 53 is transmitted through screen 12 and thereafter reflected by screen 11 back to screen 12 and thence reflected as 55 to a point outside of the field of vision. A portion of 54 impinging upon screen 11 as above stated is transmitted as 54' through 11 and to a point outside of the field of vision. Another portion of 54, in addition to that which as previously described is reflected from screen 12, is transmitted thereby to a point outside of the field of vision but for purposes of clarity is not shown. Another portion of ray 53, which is as stated above is doubly reflected from screen 12 to screen 11 and back to screen 12, is also transmitted through screen 12 as 55. Still another portion of ray 53 which is reflected back to screen 13 from screen 12 as noted above is also transmitted through screen 13 to a point outside of the field of vision but for purposes of clarity is not shown. Incident ray 56 is doubly reflected as 57 by screens 12 and 13 and passes to a point outside of the field of vision. Its portion 58 transmitted through screen 12 is in part reflected as 58' and in part transmitted as 59 by screen 11. The portion 57 which is reflected by screen 12 to screen 13 is also in part transmitted through screen 13 to a point outside of the field of vision but such transmitted portion is not shown. Incident ray 60 is reflected by screen 11 as 61 and transmitted in diminished intensity as 62.

These few illustrations from the myriad of rays will make clear this principle of my invention. It will be noted that all reflected rays fall harmlessly outside of the field of vision. From the above it will be seen that preferably the trailing end of each screen should be sufficiently far advanced (from the standpoint of the driver) that the surface of that screen does not intersect any ray which is reflected from another screen except under conditions such that it is again reflected to a point outside of the angle of vision of the driver.

In the preferred form of my invention which I am illustrating herein there may perhaps be a very few multiple reflections the emergent rays of which theoretically do fall within the angle of vision of the driver. The intensity of these rays, however, is so weakened by their multiple reflection or multiple reflection and transmission through a plurality of screens that they have no practical importance whatever. In the subjoined claims I exclude these few rays, which might perhaps be found only by laboratory measurement, by the phrase "substantially all."

From the foregoing portion of this specification it will be understood that in reality each one of the screens embodies two different means or instrumentalities, first a light-absorbing body and second a reflecting surface. The light absorbing body performs the useful and necessary function of reducing glare while the necessarily concomitant light reflecting surface must be so disposed that all reflected rays are directed outside of the field of vision of the driver. The recognition of this dual quality of each screen is one of the fundamental characteristics of my invention.

It will also be observed that the screens of the right-hand group are disposed progressively more closely to the observer's eyes from the middle of the device toward the right-hand side. It is also to be noted that the trailing edge of each screen lies substantially in a line from the observer through the leading edge of the next screen to the left.

As indicated in Figure 1 by the sight lines 22, the arrangement of the screens 11 through 14 is such as to permit a substantially unobstructed view to the right of the straight forward direction from the left eye 20 of the observer. The observer's right eye 21, of course, has a fully unobstructed view to the right of the straight forward direction, as indicated by the sight lines 23. In the shield which I am showing for purposes of illustration, if the driver looks ahead at the middle of the road the sight of his right and left eyes will coincide there, the front edge of the screen 15 of the left hand group marking the limit of the screening effect upon the left eye and screen 11 marking the limit of the screening effect upon the right eye. It will thus be apparent that the effect of the screens is relatively slight in obscuring the driver's vision of the right-hand portion of the road, while the eyes will be effectively screened from light rays originating from the oncoming car and illuminating the left-hand portion of the road. This makes it possible for the user to see the right-hand side of the road clearly, in order to determine a safe course, while protecting him from the glare from the left caused by the head-lamps of oncoming vehicles.

By reference to Figure 6 it will be noted that the line H—I representing the left eye vision does not pass through the screen 15 when the eyes of the driver are focused at a distant point. In the arrangement shown in Figure 1, the left eye vision would intersect the screen 15. When the eyes are focused at an adjacent point, as for example directly in front of the driven vehicle, the point I will of course swing to the right as viewed in this drawing. The left-hand boundary of the field of the left eye is the line AB which intersects the trailing end of the screen 17. For the right eye the corresponding area lies between the line FG and the line AB. Within each field at least one screen must always be interposed between the eyes and the left-hand area whence comes the glare and preferably two in the far left area where the glare is greatest. The above considerations also assist in the positioning of the trailing end of each screen.

In my copending application Serial Number 221,764, filed July 28, 1938, now Patent No. 2,286,219, June 16, 1942, of which this application is a continuation-in-part, I broadly claim the feature of my invention which is characterized by the fact that each line of sight between each eye and each source of light at all critical positions of the oncoming car will intersect at least one screen as in the arrangement shown by Figure 1. It will be noted however that with the screen in the position of Figure 1 at all times the left-hand group of screens is so arranged that light from an oncoming vehicle intersects one screen when distant and two or more screens when adjacent. It will be readily seen therefore that the individual screens of the left-hand group are placed so close together in relation to their length and their angular relation to the transverse plane of the shield is such that necessarily the leading edge of each, except of course the one on an end, is disposed in a line substantially normal to this transverse plane which intersects the trailing portion of an adjacent screen. This feature of my invention is broadly claimed in my said co-pending application. It will also be noted that this spatial arrangement of the screens of Figure 1 is such that the right eye is shielded by all of the screens and the left eye is shielded by those of the left-hand group. It will also be understood that with the shields disposed either as in Figure 1 or Figure 6 since both the driven and the oncoming vehicle are constantly moving my shield acts as the fulcrum around which two moving units, the two passing vehicles, move. By this simple arrangement the motionless shield acts in effect as a delicately synchronized mechanical device which increases its filtering power as the approaching glare becomes stronger, in the manner taught by my said co-pending application.

It will be clearly understood that my shield must be disposed a substantial distance, say six inches, ahead of the eyes of the driver. It is generally desirable that the screen be mounted upon the vehicle itself and not upon the head of the driver. The effectiveness of the differential screening action, and incidentally the comfort of the driver, depend upon this substantial distance. If the shield is mounted between the windshield and the driver, up to two feet will be a satisfactory distance in many instances. As a matter of practice, I generally mount the shield upon or adjacent to the windshield, as is later described. I may, however, mount the shield forwardly of the windshield. The size of the screens obviously depends upon their distance from the eyes of the driver.

Figure 4:
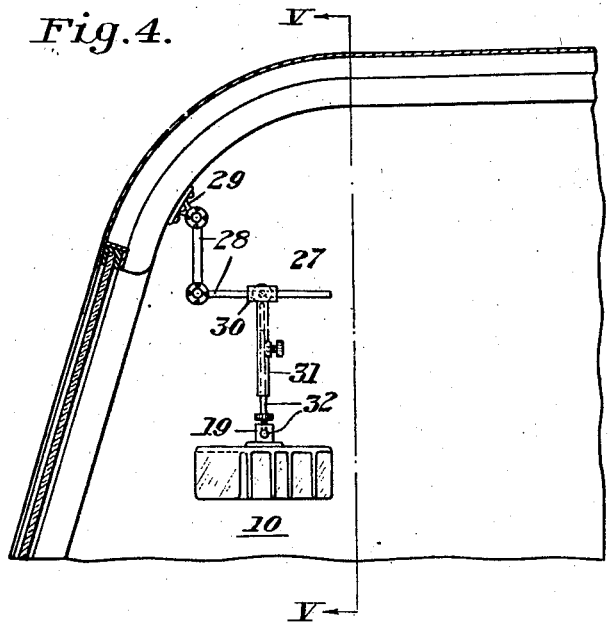
Figure 4 is a sectional view, largely diagrammatic, through the windshield and forward portion of the roof of a motor car having the invention installed therein.

As shown in Figures 4 and 5, the device may be mounted on a suitable support on the interior of a motor car and is preferably positioned at a distance of approximately two feet ahead of the driver. A convenient form of support is indicated generally at 27 and includes pivoted rods 28, one of which is pivoted to a fixture 29. The other rod may be provided with a sleeve 30 adjustable therealong having a tube 31 depending therefrom. A rod 32 having a right-angle bend passing through the stud 19 telescopes within the tube 31. This form of support permits the shield to be positioned to the best advantage of the individual driver, taking into consideration the distance between his two eyes his stature and the construction of the vehicle itself. This mounting also permits the device to be swung up out of the way during the day.

In one commercial embodiment of my invention I have found it convenient to make my screen from molded plastic screens each separately assembled with a molded plastic web as illustrated in Figure 8. If the several screens and the web are made in one operation it is difficult for some molders to maintain the surface of the screens absolutely planar. If the screens are tapered in the molding operation additional unwanted reflections and optical aberrations may be introduced. Hence as illustrated in Figure 8 I may form the screens separately including a planar screening portion 71 molded integrally with a supporting base 72 which may be slid into position and cemented in an opening 73 molded within a small boss 74 formed in the web 18'. By making the screens separately they are readily molded optically true.

A preferred alternative construction is shown in Figure 9. A planar screening portion 75 is molded integrally with a supporting base 76 the edges of which are tapered to fit an opening 77 of corresponding configuration formed in the supporting web 18''. A cover plate 78 is cemented to the side of the plate 18'' opposite that from which the screens depend.

It will be apparent from the foregoing description that the invention provides a simple, inexpensive glare-shield characterized by a highly effective screening action which increases from right to left, the screen effect being little toward the right where clear vision is desirable and increasing to a substantial extent to the left whence comes the glare. The arrangement of the screens is such as to prevent undesirable reflection of rays from light originating straight ahead, thereby further reducing the glaring effect of the headlamps of an oncoming vehicle. The motorist is thus protected against glare in the region where it ordinarily occurs, while the remainder of the field of view is substantially unobstructed.

I have described my invention as applied to a motor vehicle but it will be understood that I may use it under any conditions which demand protection against any glare.

Although I have illustrated and described but a preferred form of the invention, it will be recognized that changes in the specific structure disclosed may be made without departing from the principles of the invention as herein set forth or illustrated or the scope of the appended claims.

I claim:

1. As a new article of manufacture, a glareproof unitary shield which is adapted for mounting between the eyes of a driver of a driven motor vehicle and light from a headlight of an oncoming vehicle, said shield comprising a mounting and a plurality of plane light-retarding transparent screens disposed vertically thereupon and at such fixed angles to light from said headlight that the angles formed by substantially all ultimately emergent rays reflected toward the driver and the longitudinal axis of the driven vehicle necessarily will be of the order of 20° or more, whereby rays reflected by said screens do not reach the eyes of the driver.

2. As a new article of manufacture, a unitary anti-glare shield which is adapted for mounting between the eyes of a driver of a driven vehicle and upon said vehicle and light from the headlight of an oncoming vehicle, said shield comprising a mounting and screens having light-retarding transparent plane staggered surfaces placed vertically upon said mounting and in such differing angular relations to each other and to light from said headlight and of such length that substantially all rays which are reflected from one to another thereof and thence toward the driver are necessarily ultimately directed to points outside of the angle of vision of the driver of the driven vehicle whereby rays reflected by said surfaces do not reach the eyes of the driver.

3. An anti-glare unitary shield adapted to be disposed a substantial distance in front of the eyes of a driver of a motor vehicle, said shield comprising a mounting and a plurality of light-retarding transparent screens disposed vertically upon said mounting and in contiguous right and left hand groups inclined obliquely in relation to the longitudinal axis of said vehicle, the angles of inclination to said axis of the screens of the right-hand group decreasing progressively from right to left from the order of twelve to the order of five degrees and those of the left-hand group increasing progressively from right to left from the order of seventeen to the order of forty-five degrees.

4. An anti-glare unitary shield adapted to be disposed a substantial distance in front of the eyes of a driver of a motor vehicle, said shield comprising a mounting and a plurality of light-retarding transparent screens disposed vertically upon said mounting and in oblique relation to the longitudinal axis of said vehicle, the angle of inclination to said axis of the screen disposed upon the extreme right being of the order of twelve degrees, that of one adjacent the center of the shield being of the order of five degrees, and that of one at the extreme left being of the order of forty-five degrees.

5. An anti-glare unitary shield adapted to be disposed a substantial distance in front of the eyes of a driver of a motor vehicle, said shield comprising a mounting and a plurality of light-retarding transparent screens disposed vertically upon said mounting and in oblique relation to the longitudinal axis of said vehicle, the angle of inclination to said axis of the screen disposed upon the extreme right being of the order of twelve degrees, that of one adjacent the center of the shield being of the order of five degrees, that of one at the extreme left being of the order of 45 degrees, and the angles of inclination of the screens disposed between said right and center screen progressively decreasing and the angles of those disposed between said center and left screen progressively increasing.

6. An anti-glare unitary shield adapted to be disposed a substantial distance in front of the eyes of a driver of a motor vehicle, said shield comprising a mounting and a plurality of light-retarding transparent screens disposed vertically upon said mounting and in oblique relation to the longitudinal axis of said vehicle, the degrees of inclination to said axis of the said screens from right to left being of the order of 12, 10, 9, 6, 17, 25 and 45.

7. An anti-glare unitary shield adapted to be disposed a predetermined and substantial distance directly in front of the eyes of a driver of a motor vehicle and between him and light from an approaching motor vehicle which is about to pass said vehicle, said shield comprising a mounting and a plurality of staggered light-retarding plane screens the ends thereof relatively adjacent the driver extending different distances from a plane normal to a longitudinal axis of said vehicle intersecting said screens and being disposed vertically upon said mounting and in oblique relation to the longitudinal axis of the said vehicle, the distance between the trailing end of each of said screens from right to left and said plane becoming progressively greater.

8. A glare-proof unitary shield adapted to be disposed before the eyes of a driver of a motor vehicle comprising a mounting and a plurality of plane light-retarding transparent screens vertically disposed upon said mounting and arranged in contiguous right and left hand groups, the screens in the right-hand group being mounted substantially directly before the right eye of the driver and a substantial distance therefrom and with their trailing ends inclined slightly leftwardly in relation to the longitudinal axis of the vehicle thereby affording substantially unobstructed vision toward the right by both eyes and the screens of the left-hand group being mounted substantially directly before the left eye of the driver and a substantial distance therefrom and inclined leftwardly at a substantial angle to said axis thereby reducing the amount of light directed from the left toward either eye.

9. A glare-proof unitary shield adapted to be disposed before the eyes of a driver of a motor vehicle comprising a mounting and a plurality of plane transparent screens vertically disposed upon said mounting a substantial distance and substantially directly before the eyes of the driver and a substantial distance therefrom, said screens being disposed at angles oblique to the longitudinal axis of the driven vehicle and the trailing ends of the screens disposed toward the right of the driver being positioned progressively further from a plane normal to a longitudinal axis of said vehicle and intersecting said screen and hence progressively nearer the eyes from the left toward the right.

10. A glare-proof unitary shield adapted to be disposed before the eyes of a driver of a motor vehicle comprising a plurality of plane transparent screens and a mounting therefor, the mounting being disposed so that the screens are positioned substantially directly in front of the driver's eyes and at a substantial distance therefrom, the screens being vertically disposed upon said mounting in different angular relations to the longitudinal axis of the vehicle, the angularity of the several screens toward said axis from the driver's right to his left becoming first progressively less and then progressively greater.

11. A glare-proof unitary shield adapted to be disposed directly before the eyes of a driver of a motor vehicle comprising a mounting and a plurality of plane transparent screens disposed upon said mounting vertically and obliquely to the longitudinal axis of said vehicle and a substantial distance substantially directly before the eyes of the driver and between him and light from an oncoming motor vehicle which is about to pass the vehicle which he is driving and arranged in contiguous right and left hand groups, the degree of obliquity of the screens of the left-hand group increasing progressively from right to left.

12. A glare-proof unitary shield adapted to be disposed directly before the eyes of a driver of a motor vehicle comprising a mounting and a plurality of plane transparent screens disposed upon said mounting vertically and obliquely to the longitudinal axis of the driven vehicle and a substantial distance directly before the eyes of the driver and between him and light from an oncoming motor vehicle which is about to pass the vehicle which he is driving and arranged in contiguous right and left hand groups, the degree of obliquity of the right-hand group decreasing progressively from right toward left.

13. A glare-proof unitary shield adapted to be disposed before the eyes of a driver of a motor vehicle comprising a mounting and a plurality of plane light-retarding transparent screens disposed vertically upon said mounting and at a substantial distance and substantially directly before the eyes of a driver and disposed between his eyes and light from an oncoming vehicle which is about to pass the vehicle which he is driving and arranged in contiguous right and left hand groups, the leading ends of all of said screens being inclined to the right of the longitudinal axis of the vehicle driven by said driver, the angle of inclination of the screens of the left-hand group to the longitudinal axis of said driven vehicle being relatively much greater than those of the screens of the right-hand group.

14. A glare-proof unitary shield adapted to be disposed at a substantial distance before the two eyes of a driver of a motor vehicle comprising a mounting and a plurality of plane light-retarding transparent screens vertically disposed upon said mounting and arranged in contiguous right and left hand groups, the screens in the right-hand group being mounted substantially directly before the right eye of said driver and with their trailing ends inclined leftwardly in relation to the longitudinal axis of said vehicle at such predetermined angles thereto as to afford substantially unobstructed vision toward the right by at least the left eye, and the screens of the left-hand group being mounted substantially directly before the left eye of said driver and with their trailing ends inclined leftwardly to said longitudinal axis of said vehicle and at such predetermined angles thereto different from said previously stated angle as to protect the vision of each of said eyes toward the left by reducing the amount of light reaching it.

15. As a new article of manufacture, a glare-proof unitary shield adapted to be disposed at a substantial distance before the two eyes of a driver of a motor vehicle, said shield comprising a mounting, a first screening means disposed upon said mounting substantially directly ahead of the left eye of said driver, and a second screening means disposed contiguously to said first means upon said mounting substantially directly ahead of the right eye of said driver, said first screening means including instrumentalities effective to protect the vision of both eyes of said driver in a direction to the left of the longitudinal axis of said vehicle by reducing the amount of light reaching said eyes from said direction and said second screening means including instrumentalities which protect only the vision of the right eye of said driver in a direction to the left of said axis by reducing the amount of light reaching said eyes from said direction and are without effect upon the vision of either eye of said driver in a direction to the right of said axis.

16. A glare-proof unitary shield adapted to be disposed before the eyes of a driver of a motor vehicle comprising a transverse support and a plurality of adjacent plane light-retarding transparent screens extending in directions oblique to the longitudinal axis of the vehicle and spaced from each other and each extending a different distance from the transverse vertical plane of said shield normal to said axis and connected by and vertically mounted upon said support and each disposed in fixed but respectively different angular relation to said plane.

17. A unitary glare-proof shield adapted to be mounted before the eyes of a driver of a motor vehicle, said shield comprising a flat transverse web, a series of bosses formed in one of the flat surfaces of said web with longitudinal axes angular to the longitudinal axis of said vehicle, each of said bosses having a screen-receiving opening therein, and a plurality of screens, each of said screens comprising a plane transparent light-retarding portion and a supporting portion, said supporting portion being mounted within one of said openings.

18. A glare-proof shield adapted to be mounted before the eyes of a driver of a motor vehicle comprising a unitary structure consisting of a flat transverse web formed with openings of predetermined configurations in one flat surface thereof, a plurality of light-retarding screens, each of said screens embodying a plane transparent light-retarding portion and a supporting portion of a configuration corresponding to that of the openings in said web, said screens being mounted to depend from said web with said supporting portions disposed within said openings of said web, and a cover member attached to the flat side of said web opposite that from which said screens depend for maintaining said screens in assembled relation to said web.

19. As a new article of manufacture, an antiglare unitary shield which is adapted for mounting between the eyes of a driver of a motor vehicle and thereupon and light from a headlight of an oncoming vehicle, said shield comprising a mounting and a series of plane screens of predetermined different lengths disposed vertically upon said mounting and adjacent each other and obliquely to the longitudinal axis of the driven vehicle and in predetermined irregular fixed angular relation both to each other and to the longitudinal axis of the vehicle, each of said screens being composed of bodies which absorb a substantial portion of said light which is transmitted to points within the area between said shield and the eyes of the driver and within the angle of vision of the driver and of surfaces which divert substantially all rays which are ultimately reflected therefrom in a direction toward the eyes of the driver to points outside of said area whereby substantially no internally reflected rays of said light reach the eyes of said driver.

20. As a new article of manufacture, an antiglare unitary shield for a motor vehicle which is adapted for mounting upon said vehicle, said shield embodying plane screens disposed obliquely to the longitudinal axis of said motor vehicle and between the eyes of the driver and light from a headlight of an oncoming car for absorbing a substantial portion of the light therefrom thereby protecting the eyes of said driver from glare, said screens being of such predetermined and different lengths and of such predetermined angular relation to each other and to said impinging light that certain of the surfaces thereof initially reflect a portion of said impinging light drectly toward the eyes of said driver and certain other surfaces thereof ultimately reflect substantially all of said light so initially reflected away from the eyes of said driver whereby substantially no light from said oncoming vehicle which is reflected by said shield reaches the eyes of said driver.

ANTHONY MARTINEK.